United States Patent
Camurati et al.

(10) Patent No.: US 8,587,157 B2
(45) Date of Patent: *Nov. 19, 2013

(54) DEVICE FOR TRANSPORTING ENERGY BY PARTIAL INFLUENCE THROUGH A DIELECTRIC MEDIUM

(75) Inventors: Patrick Camurati, Paris (FR); Henri Bondar, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,060

(22) Filed: Jun. 28, 2012

(65) Prior Publication Data
US 2012/0262005 A1    Oct. 18, 2012

Related U.S. Application Data

(62) Division of application No. 12/293,531, filed as application No. PCT/FR2006/000614 on Mar. 21, 2006, now Pat. No. 8,242,638.

(51) Int. Cl.
*H04B 5/00*    (2006.01)

(52) U.S. Cl.
USPC .................................. 307/104; 455/41.1

(58) Field of Classification Search
USPC .................................. 307/104; 455/41.1
See application file for complete search history.

(56) References Cited

U.S. PATENT DOCUMENTS

| 645,576 A | 3/1900 | Telsa |
| 4,763,340 A | 8/1988 | Yoneda et al. |
| 5,572,441 A | 11/1996 | Boie |
| 5,621,913 A | 4/1997 | Tuttle et al. |
| 6,336,031 B1 | 1/2002 | Schyndel |
| 6,615,023 B1 | 9/2003 | Ehrensvard |
| 6,856,788 B2 | 2/2005 | Change et al. |
| 6,859,050 B2 * | 2/2005 | van de Goor et al. ......... 324/695 |
| 6,865,409 B2 * | 3/2005 | Getsla et al. .................. 600/393 |
| 6,943,705 B1 * | 9/2005 | Bolender et al. ................ 341/33 |
| 7,142,811 B2 | 11/2006 | Terranova et al. |
| 7,521,890 B2 * | 4/2009 | Lee et al. ...................... 320/108 |
| 7,576,514 B2 * | 8/2009 | Hui .............................. 320/108 |
| 7,622,891 B2 * | 11/2009 | Cheng et al. .................. 320/108 |

(Continued)

FOREIGN PATENT DOCUMENTS

| DE | 103 04 584 | 8/2004 |
| DE | 103 04 584 A1 | 8/2004 |

(Continued)

*Primary Examiner* — Adi Amrany
(74) *Attorney, Agent, or Firm* — Dickstein Shapiro LLP

(57) ABSTRACT

The invention proposes a means for transporting electrical energy and/or information from a distance by using, at a slowly varying regime, the Coulomb field which surrounds any set of charged conductors. The device according to the invention is composed of energy production and consumption devices situated a short distance apart, it uses neither the propagation of electromagnetic waves nor induction and cannot be reduced to a simple arrangement of electrical capacitors. The device is modeled in the form of an interaction between oscillating asymmetric electric dipoles, consisting of a high-frequency high-voltage generator (1) or of a high-frequency high-voltage load (5) placed between two electrodes. The dipoles exert a mutual influence on one another. The devices according to the invention are suitable for powering industrial and domestic electrical apparatus, they are especially suitable for powering low-power devices moving in a limited environment and for short-distance non-radiating transmission of information.

10 Claims, 3 Drawing Sheets

(56) References Cited

U.S. PATENT DOCUMENTS

| | | | |
|---|---|---|---|
| 7,809,331 B2 * | 10/2010 | Kano | 455/41.1 |
| 8,049,370 B2 * | 11/2011 | Azancot et al. | 307/104 |
| 8,090,550 B2 * | 1/2012 | Azancot et al. | 702/62 |
| 2002/0051435 A1 | 5/2002 | Giallorenzi et al. | |
| 2002/0132585 A1 | 9/2002 | Palermo et al. | |
| 2002/0183003 A1 | 12/2002 | Chang et al. | |
| 2008/0076351 A1 | 3/2008 | Washiro | |
| 2009/0026675 A1 | 1/2009 | Kanaya et al. | |

FOREIGN PATENT DOCUMENTS

| | | |
|---|---|---|
| EP | 1997238 A1 | 12/2008 |
| FR | 2 875 649 A1 | 3/2006 |
| FR | 2 875 939 A1 | 3/2006 |
| FR | 2 876 495 A1 | 4/2006 |
| JP | 6-150079 A | 5/1994 |
| JP | 7-134894 A | 5/1995 |
| JP | 11-513518 A | 11/1999 |
| JP | 2003-523699 A | 8/2003 |
| JP | 2005-079786 A | 3/2005 |
| JP | 2008-099236 A | 4/2008 |
| WO | WO-93/23907 A1 | 11/1993 |
| WO | WO-97-14112 A1 | 4/1997 |
| WO | WO-2007-107642 A1 | 9/2007 |

* cited by examiner (b)

DEVICE FOR TRANSPORTING ENERGY BY PARTIAL INFLUENCE THROUGH A DIELECTRIC MEDIUM

CROSS REFERENCE TO RELATED APPLICATIONS

The present application is a divisional of application Ser. No. 12/293,531, filed Sep. 18, 2008, which is a §371 application of PCT/FR2006/000614, filed Mar. 21, 2006, the entire contents of each of which are incorporated herein by reference.

TECHNICAL FIELD

The invention relates to the topic of electrical energy transport.

Observations on the effects of electricity, first empirically in the 17th and 18th centuries with the use of electrostatic machines, then quantitatively from the work of Charles Augustin Coulomb (1736-1806) followed by numerous others that were supported by inventions of which the first significant one was the Leyden jar, were assembled and represented for the first time with a formalism unified by Sir James Clerk Maxwell (1831-1879). The discovery of electromagnetic waves by Heinrich Rudolph Hertz (1857-1894) was the prelude to the invention of the radio in 1896 by Marconi. The Maxwell equations, supplemented by the Lorentz (1853-1928) force relation, (simply represented, since, in a more compact formalism) are not only still relevant but also gave birth to relativity In fact it can be said that Einstein transposed the invariance character to mechanics using the Lorentz transformation observed in the behavior of the Maxwell-Lorentz equations. In accordance with these latter, we can classify remote actions into three categories:

a purely electrical action that corresponds to the mechanical repulsion/attraction of two distant charges and which gives rise to the definition of the Coulomb potential;

a purely magnetic action that corresponds to the repulsion/attraction of two magnets and allows us to define a scalar magnetic potential (not to be confused with vector potential);

to complete the set, a combined action that occurs when the phenomena present variations that are sufficiently quick over time and which corresponds to the propagation of electromagnetic waves.

We note here that the first two actions are not self-propagating, the third, which corresponds to the propagation of energy at the speed of light, is associated with transverse waves (longitudinal waves are not compatible with Maxwell's equations). Let us also note that the applications of the action of forces at a distance (remote forces) may exhibit a mechanical macroscopic character when the charges are bound to matter, or a macroscopic character that is only electrical when the charges are free in an immobile solid material.

We shall use the following terms: "electrical influence" (electrostatic induction) or simply "influence" to designate the remote transport of energy by electrical force alone; "magnetic induction", or simply "induction", to designate the remote transport of energy by magnetic force alone. Electromagnetic waves are the specific case in which energy is propagated by oscillations, in quadrature, in both these forms of energy.

Only electromagnetic waves can transport energy over great distances, the other cases correspond to energy that is stored in the immediate area surrounding the generators; energy is available only over a short distance, i.e. locally. Mathematically, the energy density that can be associated with scalar potentials decreases very rapidly with distance.

The applications of influence and induction are numerous and varied. As regards the mechanical applications of influence, we can cite, notably, the electroscope and charge projectors (paints, inks, dust), used in machines such as paint sprayers, photocopiers, air purifiers. The mechanical applications of induction (magnets, electromagnets) are very widespread.

In the context of applications of transformation of mechanical energy into electrical energy, and vice versa, we can, as regards magnetic induction, note the following: typical motors and electric generators. Influence motors also exist, influence generators also being incorrectly called "electrostatic machines". Local storage of magnetic energy (induction) is achieved through components called coils or induction coils, whereas local storage of electrical energy (influence) is achieved using capacitors. Particular arrangements of induction coils or capacitors allow induction or influence transformers to be produced. It should be noted that these types of devices involve alternating currents. The laws of influence and induction remain valid in variable (alternating current) applications when the frequencies used are rather low, in this case we use the terms "quasi-static" or "quasi-stationary" regime. In practice, it is necessary for the size of the device to remain small compared to the wavelength in the medium involved. For higher frequencies, influence and induction are no longer dissociable and propagation phenomena must be taken into consideration.

The invention that we will describe is based on the possibility of transporting electrical energy over a short distance, through a vacuum or any dielectric insulating material, by influence. In this regard, induction and electromagnetic waves do not contribute to the principle in use and cannot therefore be present except as part of attached devices or losses. The devices according to the invention bring into play types of multiple capacitive coupling between multiple conductors which have historically been designated according to the expression "conductors under partial influence". This type of regime is quite different from the usual idea we have of standard devices known as "total influence" devices, it therefore seems necessary to us to get back to the basics of electrostatics which allow us to define them more precisely.

If we take a spherical conductor, place it far away from any other conductor, and give it an electrical charge Q, the potential V that can be associated with the conductor is given by: $V=Q/4\pi \in R$ (taking the usual convention: nil potential at infinity), where R is the conductor radius and $\in$ is the electrical permittivity of the surrounding dielectric medium. The electrical charge on an isolated conductor is therefore intrinsically associated with the potential by the formula: $Q=C.V$ (1), where $C=4\pi \in R$. The capacitance obtained can be called the "intrinsic capacitance" of the conductor because, after a fashion, it measures the coupling, by influence, between the electrode and the surrounding dielectric medium. The value obtained for typical gases is very close to the one obtained in a vacuum. When several electrodes are present in a given dielectric medium, we can define the capacitance for each conductor using formula (1), the value obtained is different from that obtained for the isolated conductor. Also, we should define the capacitances of mutual influence. In the general situation of n influence conductors, charges $Q_i (i=1, 2, \ldots, n)$ obtained on the n conductors are associated with potentials $V_i$ by the matrix relationship $(Q_i)=(C_{ij})(V_i)$, where matrix $(C_{ij})$ is an n×n matrix. With coefficient $C_{ii}$ being the capacitance proper to conductor i, it is not equal to its intrinsic capacitance unless the distances between conductor i and the other conductors are large compared to the size of conductor i. When two conductors are very close together and have large surfaces facing each other, it can be shown that: $C_{11}=C_{22}=-C_{12}=-C_{21}=C$ and $Q_1=-Q_2=Q$ and therefore: $Q=C(V1-V2)$. We then say that the conductors are in total influence. We can also say that two conductors are in total influence when all the field lines leaving a conductor systematically return to the other; they are in partial influence only if some lines terminate on conductors other than the two conductors initially being considered.

The case of interaction between two remote electric dipoles, upon which the invention is based, arises from the partial influence between four conductors and cannot therefore in any case be equated to an assembly of standard capacitors, even asymmetric ones. In this type of case, it is not possible to use the expression "capacitive coupling" to describe the overall situation, on the other hand it is possible to discuss the matrix of capacitances or capacitive coefficients.

The physics of influence (electrostatic induction), in the general case where it is not total, is relatively complex. It can be noted that the law of conservation of intensity is no longer verified in it. It is easy to understand that if, in a dynamic application, electrical charges deposit themselves on the walls of a long, thin conductor, their quantity, or, more precisely, their flow, decreases with distance (and the inverse if the charges are collected). Maxwell's equations require conservation of total current density flux: $j_m+j_d$ where: $j_d$ is the displacement current density given by $$j_d = \varepsilon \frac{\partial E}{\partial t}$$

and $j_m$ the physical current density (density of the current which is circulating in the conductors), the displacement current therefore replaces the physical current at the conductor/dielectric boundary. This remains valid for a vacuum, which is therefore also crossed in the vicinity of a conductor by a displacement current. The displacement current density, which is usually very low, can be increased by using intense electrical fields and high frequencies. Nevertheless, contrary to a widespread mistaken idea, displacement currents are not always associated with electromagnetic waves (otherwise we would have to consider that waves cross capacitors operating in an alternating regime).

There local electrical or magnetic phenomena, which cannot be associated with waves and which require us to consider the dielectric surrounding the conductors as a medium under electrical or magnetic constraints, can, by analogy with physical media, be called "transport phenomena". In this way, the electrons that move coherently in the conductors are not in direct contact and interact with each other in the same way as remote physical conductors, by influence.

Although the invention relates to remote energy transmission without solid contact through a dielectric medium, it does not relate to the transmission of electromagnetic energy in the form of radiation but, in fact, to the field of electrical energy transport.

STATE OF THE ART

Influence (electrostatic induction) was discovered and studied long before electromagnetic induction. Aside from total-influence capacitors, until now it has given rise to only a few industrial applications that are purely electrical. The mechanical forces that can be obtained by influence between two remote charges are very weak compared to those that we know are produced between two magnets. Significant energy transport cannot be achieved for partial-influence devices except in the case where high-voltage, high-frequency generators are used.

The conditions required to transport electrical energy by influence were assembled for the first time by Nikola Tesla (1856-1943). The devices used were of large size (several tens of meters) and the effects observed extended over several tens of kilometers, i.e. over distances greater than the wave length. In this way, Tesla was not in a quasi-static-regime. In his US patent 648621 in 1900, he describes an arrangement that allows remote transverse transmission of energy. The fact that he used the ground on one side and ionized layers of the atmosphere on the other side (experiments at Colorado Springs) makes us think that he achieved something more like transverse wave propagation that was partially guided by the ionosphere. Moreover, on a stormy day he observed the first stationary electromagnetic waves. More recently, Stanislav and Constantin Avramenko, in patent WO 93/23907 thought they obtained longitudinal waves that were propagated along a very fine wire. The receiver device that they used in one of their embodiments seems to call upon the charge reservoir technique that we are also using in our invention. In this same patent, the generator (seen as an emitter of very specific waves) is therefore of a nature that is different from the load. In this regard, we can note the absence of a connection on one of the terminals of the transformer's secondary circuit.

Our invention distinguishes itself from Tesla's work and patents by the fact that energy is transmitted over short distances, preferentially on a longitudinal axis (parallel to the electric field) and without requiring the use of a connection to ground.

Our invention distinguishes itself from S. and C. Avrarnenko's patent by the fact that energy is transmitted over short distances without wires or waves and by the fact that generators and loads are of the same nature.

Our invention is distinct from any type of grouping of capacitors, even asymmetrical ones, due to the fact that the simplest embodiment of the invention cannot in any case be reduced to such a type of assembly.

STATEMENT OF THE INVENTION

Figure 1:
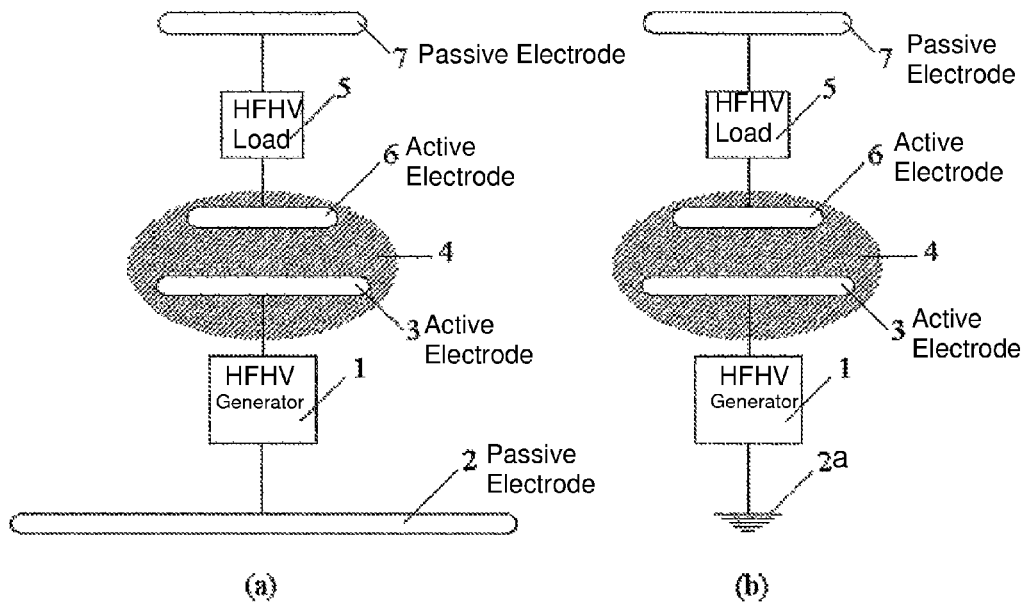
FIG. 1 shows a first embodiment of the present invention.

The device according to the invention proposes a method of transporting electrical energy over a relatively short distance through a dielectric medium without using electric wires or requiring the slightest form of physical contact (such as, for example, the use of grounding). In this regard, the invention allows energy to be transported between two remote points, in a vacuum. The technique that is used is based on the use of the Coulomb interaction, which is also called: electrical influence.

The word "transport" as well as verbs and adjectives derived from it, designates the longitudinal mechanical nature associated with the concept of electrical force. In this way, even if within the scope of the invention, this latter is exerted remotely (at a distance) through a vacuum, its action must not be confused with electromagnetic transmission (which exhibits a transverse non-mechanical nature and which does not participate in the principle that is used here, other than in the form of undesired losses).

More precisely, the device according to the invention finds itself within the context of partial influence, a context in which some conductors must be considered either as isolated and in interaction with the surrounding dielectric medium (optionally, in a vacuum) or as in interaction with multiple remote conductors, which are sometimes far away and undefined. For some conductors used in the context of the invention, the intrinsic capacitance of the isolated conductor is the important physical property that sets the order of magnitude of the performances obtained.

The mathematical tool that is adapted to handle the case of multiple conductors in interactions is the matrix description. In the limit case of media that we can consider to be continuous, physicists also use the expression "near field" (as opposed to "distant field") which is easier to handle.

The device according to the invention cannot in any case be reduced to an assembly of standard capacitors, whose object would be to create an electrical coupling between two solid, unconnected parts. In such an assembly, each element (a traditional capacitor) can be considered to be entirely distinct from the others whereas, in the invention, there are multiple couplings between the electrodes.

The device according to the invention calls upon intense electrical fields that exhibit swift temporal variations to use, in the dielectric media outside the conductors, the Maxwell displacement current which is usually extremely weak. These same fields are associated with potentials and impedances which can be very high depending on the size of the devices produced.

In the device according to the invention, the frequencies implemented, which shall henceforth be called high frequencies (H. F.), are much higher than those customarily used for the transport of electrical energy but in spite of everything remain rather low so that electromagnetic radiation will be negligible. This is the result when the size of a device represents only a small portion of the wavelength in the exterior medium surrounding this latter, or by judicious use of forms (shapes) and phase differences applied to different electrodes.

In the embodiments of the invention that we shall describe below, large-amplitude, rapidly-varying fields are obtained using high-voltage, high-frequency generators (hereinafter referred to as H. T. H. F. generators). H. T. H. F. will be associated with H. T. H. F. loads.

Alternating voltages are either purely sinusoidal or consist of multiple frequencies and go from to several hundred volts for applications at very low powers or within the scope of devices of very small sizes (micrometric distances), up to several MV (millions of volts) for high-power or large-size applications.

H. T. H. F. generators and loads that function under high voltage and low intensities usually exhibit high impedances.

The devices according to the invention consist of at least two distinct parts:

An energy-producing device consisting of at least one H. T. H. F. generator and multiple electrodes, electrically connected to the generator(s), whose role is to charge the surrounding medium, optionally a vacuum, with electrical energy.

An energy-consuming device consisting of at least one H. T. H. F. load and, optionally, electrodes electrically connected to this/these load(s).

The electrodes and connecting wires are defined in the context of the invention as conducting media that have spatial extensions and shapes that are well defined. Mathematically, they correspond to surfaces or volumes that are practically equipotential. The electrodes and connecting wires customarily consist of conductive metals, but can consist optionally partially or totally of conductive liquids or ionized gases, perhaps contained inside solid dielectric materials.

The H. T. H. F. generator according to the invention are obtained in many different ways, for example, from an alternating low voltage applied to the primary of an induction transformer that provides a high voltage to the secondary and which is capable of operating at relatively high frequencies, but also optionally using piezoelectrical transformers or any other technology that gives the same results.

The H. T. H. F. loads, according to the invention, are devices that are similar to those of H. T. H. F. generators; optionally, to supply power to a low-voltage device they use the same technologies as the generators when they are reversible.

The connection obtained in the context of devices according to the invention is simultaneously bidirectional and verifies the action/reaction principle.

It arises from this that, when the technologies used, both on the generator side and on the load side, are reversible, then the entire device is reversible and energy can circulate in either direction.

When we consider simple systems, not composed of multiple electrodes subjected to phase differences, the H. T. H. F. generators (as also, optionally, the H. T. H. F. loads) are connected by conductive wires to two types of electrodes placed, preferably, at short distances from the generators, in order to prevent radiative losses.

The abovementioned electrodes have different properties and functions depending on their size. A large electrode, powered by the same alternating current as a small one, is subject to lower voltages and thus generates weaker electric fields in its environment; we shall name this type of electrode a "passive electrode" or "reservoir electrode". The largest reservoir that we have, optionally, available to us is the Earth itself. The smaller electrodes are associated with larger fields and are called: "active electrodes": we call the ones that create the field "generator electrodes", and the ones that are subjected to it are called "electromotive electrodes". In a reversible embodiment, the electrodes are, in turn, electromotive and generative, depending on the direction in which the energy is being transported.

FIG. 1 shows one possible production/consumption association. An H. T. H. F. generator (1) is connected on one side to a large-size passive electrode (2a) (FIG. 1a) or to ground (reservoir electrode) (FIG. 1b) and on the other side to a smaller, active electrode (3) (generator electrode) which produces an intense field zone where the energy is concentrated (4). The high-impedance load (5), for its part, is connected on one side to a small electrode (6) (electromotive electrode) placed in the zone where the field is intense, and on the other side to another electrode, preferably a larger one (7) placed in a zone where the field is weaker (passive electrode).

The embodiment described above (FIG. 1), leads back to a consideration of the interaction between two asymmetric oscillating electric dipoles. In this regard, the two electrical dipoles interact in a manner that is similar to the interaction obtained between two magnetic induction coils traversed by alternating electrical currents. The device according to the invention is therefore, for influence, the equivalent of partial coupling transformers. The coupling takes place through a dielectric medium of permittivity ∈, instead of an inductive medium of magnetic permeability µ in the case of a transformer.

As in the case of the air transformer, numerous configurations are possible for the two electric dipoles, the specific arrangement where the two dipoles are aligned on the same axis allows the range to be improved and, in the specific case of influence, a limitation of the number of active electrodes.

In the case of loads that require the impedance to be adapted, there is, in the context of the invention, a minimum of only two active electrodes, one on the side of the producer device (the generating electrode), and the other on the side of the consumer device (the electromotive electrode).

In the case of loads that naturally exhibit a high impedance, such as ionized low-pressure media, solid materials that are highly resistive or some semi-conductors, such loads are placed, optionally, directly in the intense-field zone without the need for connections with additional electrodes. In these types of cases, it is the physical boundaries of such media that play the role of electrodes. In this way, in the case of remote powering of an H. T. H. F. load of high natural impedance, such as an ionized gas contained in a solid dielectric enclosure and use is made of a ground connection connected to one of the generator's terminal, there is now only one single electrode that needs to be connected to the generator's other terminal. This single electrode is, thus, necessarily the generator electrode.

Figure 2:
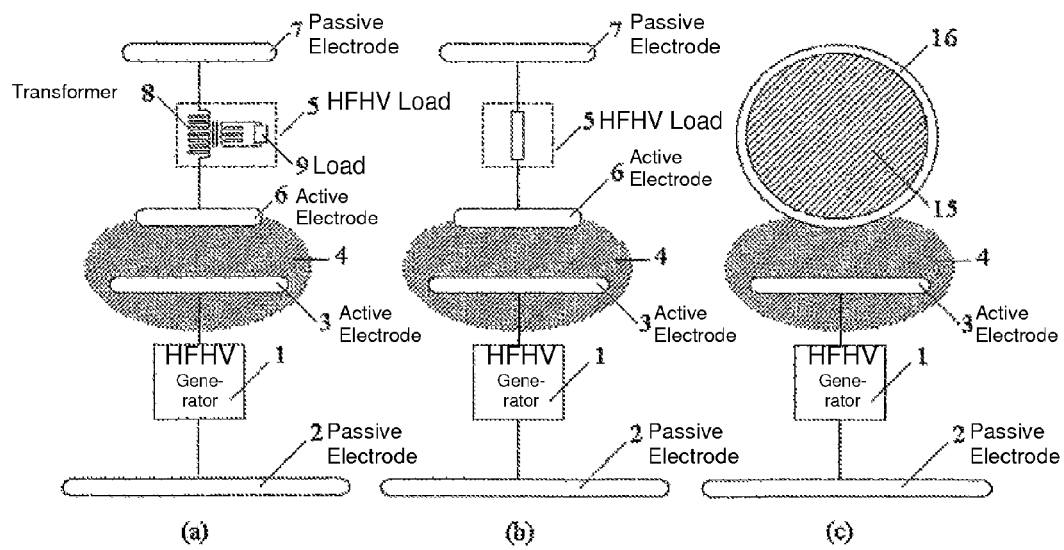
FIG. 2 represents different possible situations for the internal composition of the H. T. H. F. load.

FIG. 2 represents different possible situations for the internal composition of the H. T. H. F. load.

FIG. 2a represents the case in which the use of an induction transformer (8) associated optionally with a rectifying device (not shown) allows a final low-impedance load (9) to be powered.

FIG. 2b represents the case in which the H. T. H. F. load consists simply of one component that naturally exhibits high impedance.

FIG. 2c represents the case in which the H. T. H. F. load consists of a low-pressure ionized gas (15) contained in a solid dielectric enclosure (16).

Figure 3:
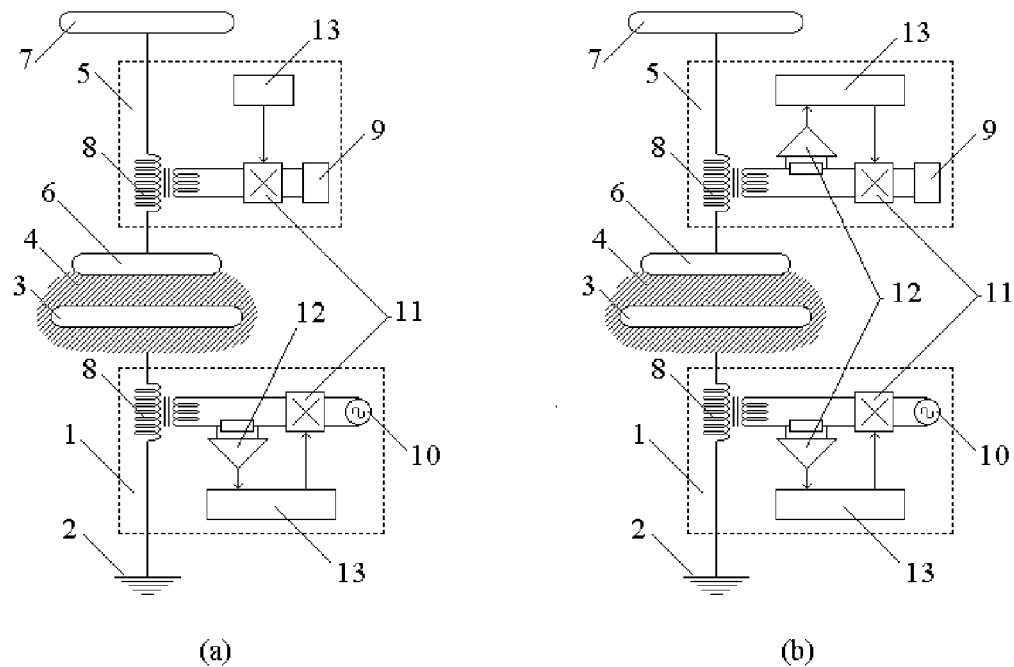
FIG. 3 illustrates further embodiments of the invention.

FIG. 3 illustrates more sophisticated embodiments of the invention.

FIG. 3a represents a case where an additional modulation device (11) is inserted on the side of the consuming device, between the step-down transformer (8) and the low-voltage charge (9). This modulation, associated with an amplification device (12) on the side of the consuming device, allows simultaneous transport of the information in the direction opposite to that in which energy is being transported. The information is generated by a control and management device (13) located on the consuming device side; a similar device associated with a second modulator placed on the generator device side, between the step-up transformer (8) and the power source (10), allows the latter to adapt to the power requirements of the consumer device.

FIG. 3b represents a case in which amplification and additional management on the consuming device side allow bi-directional transmission, which is optionally simultaneous, of information between the consumer and generator devices.

These exchanges are not affected by the direction in which energy is transported. An inversion in the direction of energy transport is possible when the unit assembled uses reversible devices (9) and (10).

In one embodiment of the previous device, a communication protocol allows the consumer device to request the producer device to adapt to its requirements by varying the mean amplitude of the voltages applied to the generator electrodes. Inversely, the producer device can inform the consumer device about its power reserves. The consumer device may be backed up by a means of internal energy storage in case of temporary rupture of the connection.

In one embodiment of the invention leading back to a coupling between two dipoles, which corresponds to a quadripolar structure, the energy transmitted decreases proportionally to $1/R^4$ when the distance R between the dipoles becomes great. The practical range of a producer dipole that powers a relatively small consumer dipole is thus on the order of several times the size of the producer dipole.

In the case in which the consumer dipole is energy independent, the range for transport of information only between the producer dipole and the consumer dipole is much greater than that described previously if sufficient amplification of the received signal can be achieved both on the side of the consumer device and that of the producer device.

In one embodiment of the invention, the producer device goes automatically into power-save mode when the load no longer requires energy, by greatly decreasing the mean amplitude of voltages applied to the generating electrode without breaking the information connection with the consumer device. A more developed power save mode is achieved by intermittent interrogations between the producer and consumer devices.

Finally, in one specific embodiment, only information can be transmitted (according to either a mono, alternating bi-directional, or simultaneous mode).

In some embodiments of the invention, the producer and consumer devices, or only the generating and electromotive electrode(s), are kept in place by one or more mechanical connections, which may be removable, which make use of dielectric materials in such manner that the generator and electromotive electrodes face each other without direct electrical contact. This type of mechanism approaches an "electrical outlet" type device.

In some embodiments of the invention, producer and consumer devices can be moved relative to each other without the "energy connection" that unites them being broken. This limited mobility in translation and in rotation can, as an option, be extended to full angular mobility by appropriate management of rotating fields. Relative rotation between a producer device and a consumer device can, optionally, be compensated for by a counter rotation of the field, obtained either by application of voltages of inverted phases to a set of electrodes on the producer device side, or by internal switching of a set of electrodes on the consumer device(s) side.

Figure 4:
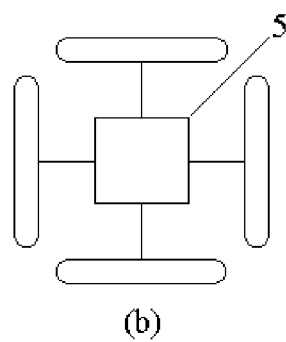
FIG. 4 illustrates the case in which a set of four internally-switched electrodes (not shown in the figure) are used so that a mobile consumer device remains powered, independently of its angular position in space.

FIG. 4 illustrates the case in which a set of four internally-switched electrodes (not shown in the figure) is used so that a mobile consumer device remains powered, independently of its angular position in space. A set of a minimum of 6 electrodes is required if the consumer device is to rotate around two axes.

Management of the rotation of the one or more fields can, optionally, make use of the information connection between the producer and consumer device(s).

Figure 5:
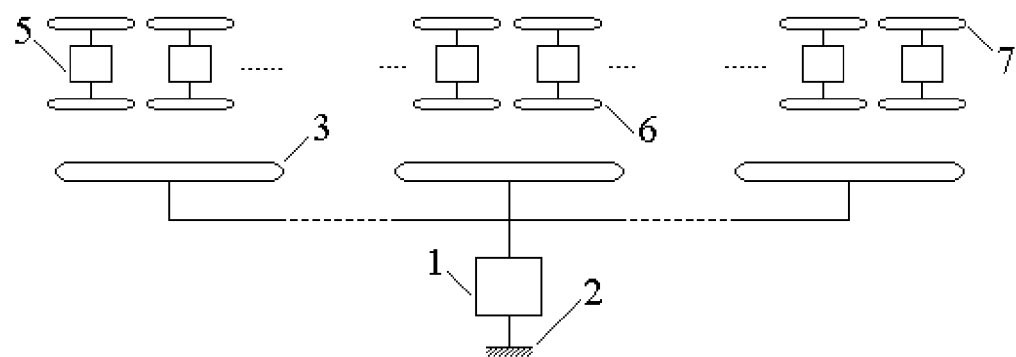
FIG. 5 illustrates an embodiment for the distribution of energy using a single producing device towards several consumer devices over short distances.

FIG. 5 illustrates an embodiment for the distribution of energy using a single producing device towards several consumer devices over short distances.

Figure 6:
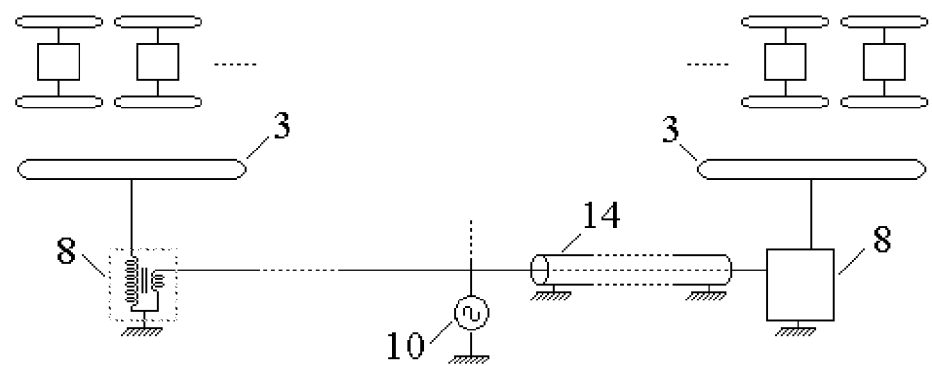
FIG. 6 illustrates an embodiment that is possible for the distribution of energy over medium or great distances.

FIG. 6 illustrates an embodiment that is possible for the distribution of energy over medium or great distances. In FIG. 6, energy is provided to the circuit by a high-frequency, low-voltage generator (10), it is then distributed to remote step-up transformers (8). The use of low voltage distribution allows the reactive power due to the intrinsic capacitance of the wires (and Joule losses associated with it), as well as the radiation induced by the wires (left part of FIG. 6), to be limited. For even greater distances, a coaxial-cable type propagation line (14) can also be used to limit losses by electromagnetic radiation (right portion of FIG. 6).

The electrodes (like the connecting wires) on both the producer device and consumer device sides, do not need to be good conductors and, optionally, may have relatively high impedance. Advantageously, they consist of very little conductive or semi-conductive material.

Active electrodes in the embodiments that use high power can, optionally, be covered with one or more solid insulating materials or, more generally, with a material with a high breakdown voltage and low surface conductivity in order to guarantee the safety of the user by preventing high local increase of current density in case of accidental localized contact.

The invention claimed is:

1. An electricity-transport system for transporting electrical energy from an energy-producer device to an energy-consumer device, the system comprising:
    the energy-producer device having a first active electrode, a first passive electrode, and a generator connected on a first side thereof to the first active electrode and on a second side thereof to the first passive electrode; and
    the energy-consumer device having a second active electrode, a second passive electrode, and a load connected on a first side thereof to said second active electrode and on a second side thereof to said second passive electrode; wherein
    the second active electrode interacts with the first active electrode by a Coulomb interaction, forming a direct capacitive coupling between the first active electrode and the second active electrode;
    the first passive electrode is coupled to the second passive electrode of the energy-consumer device by capacitive coupling;
    at least one of the passive electrodes is not connected to a ground potential; and
    the first active electrode and first passive electrode are asymmetrical, the first passive electrode being either larger in size than the first active electrode or a ground, and an electric field produced between the first passive electrode and the second passive electrode is weaker than an electric field produced between the first active electrode and the second active electrode.

2. The electricity-transport system according to claim 1, wherein the generator of the energy-producer device is a high-voltage high-frequency generator having a first end connected to the first active electrode so as to subject the first active electrode to variations in potential, and a second end of the generator being coupled to the first passive electrode.

3. The electricity-transport system according to claim 2, wherein the second active electrode is disposed in an area where the variations in potential are high and the second passive electrode is disposed in an area where variations in potential are lower.

4. The electricity-transport system according to claim 3, wherein the energy-producer device and energy-consumer device each comprise a modulator adapted to cause modulation of the varying potentials in said area, making use of the frequency or frequencies used for energy transport or of superposed frequencies which do not produce significant losses by radiation, whereby to allow simultaneous bidirectional transfer of signals that transport information independently of the direction in which the energy is transported.

5. The electricity-transport system according to claim 4, wherein the energy-producer device and the energy-consumer device each comprise an amplifier for amplifying information transported therebetween.

6. The electricity-transport system according to claim 1, wherein the respective roles of the energy-producer device and energy-consumer device are reversible.

7. The electricity-transport system according to claim 1, wherein the active electrodes are covered with one or more solid insulating materials.

8. The electricity-transport system according to claim 1, wherein at least one of the first and second active electrodes are in electrical contact with at least one removable mechanical electrical outlet connection.

9. The electricity-transport system according to claim 1, wherein the energy-producer device is a dipolar, asymmetrical oscillating energy-producer device and the energy-consumer device is a dipolar, asymmetrical oscillating energy-consumer device.

10. An electricity-transport system for transporting electrical energy from an energy-producer device to an energy-consumer device, the system comprising:
    the energy-producer device having a first active electrode, a first passive electrode, and a generator connected on a first side thereof to the first active electrode and on a second side thereof to the first passive electrode; and
    the energy-consumer device having a second active electrode, a second passive electrode, and a load connected on a first side thereof to said second active electrode and on a second side thereof to said second passive electrode; wherein
    the second active electrode interacts with the first active electrode by a Coulomb interaction, forming a direct capacitive coupling between the first active electrode and the second active electrode;
    the first passive electrode is coupled to the second passive electrode of the energy-consumer device by capacitive coupling; and
    the first active electrode and first passive electrode are asymmetrical, the first passive electrode being either larger in size than the first active electrode or a ground, and an electric field produced between the first passive electrode and the second passive electrode is weaker than an electric field produced between the first active electrode and the second active electrode, wherein:
    the generator of the energy-producer device comprises a second generator and a plurality of transformers remote from said second generator and connected thereto by coaxial cables; and
    the energy-producer device comprises a plurality of first active electrodes, connected to respective ones of said plurality of transformers,
    whereby electricity can be transported to the energy-consumer device, remote from said second generator relative to any of said plurality of first active electrodes.

* * * * *